(12) United States Patent  
Kettle, Jr. et al.

(10) Patent No.: US 6,189,714 B1  
(45) Date of Patent: Feb. 20, 2001

(54) APPARATUS FOR CONNECTING A DEVICE INTO A BRAKE PIPE HOSE CONNECTION BETWEEN RAILWAY CARS AND/OR LOCOMOTIVES

(75) Inventors: Paul J. Kettle, Jr., Ijamsville, MD (US); Edward W. Gaughan, Greensburg, PA (US); Jonathan A. Cohen, Silver Spring, MD (US)

(73) Assignee: Westinghouse Air Brake Company, Wilmerding, PA (US)

( * ) Notice: Under 35 U.S.C. 154(b), the term of this patent shall be extended for 0 days.

(21) Appl. No.: 09/174,969

(22) Filed: Oct. 19, 1998

(51) Int. Cl.[7] ..................................................... B61G 3/00
(52) U.S. Cl. ........................... 213/76; 439/191; 439/288; 285/125.1; 285/68
(58) Field of Search ................................ 285/125.1, 369, 285/133.11, 65, 66, 68; 439/195, 288, 31, 191, 376; 213/76

(56) References Cited

U.S. PATENT DOCUMENTS

| | | | |
|---|---|---|---|
| 198,015 | * 12/1877 | Green et al. | 213/76 |
| 307,902 | * 11/1884 | Batchelor | 213/76 |
| 481,984 | * 9/1892 | Thomas | 213/76 |

FOREIGN PATENT DOCUMENTS

| | | | |
|---|---|---|---|
| 34233 | * 1/1886 | (DE) | 285/68 |

* cited by examiner

Primary Examiner—S. Joseph Morano  
Assistant Examiner—Frantz F. Jules  
(74) Attorney, Agent, or Firm—James Ray & Associates

(57) ABSTRACT

An adapter is designed to interconnect the two glad hands that extend from the adjacently disposed ends of a pair of rail vehicles in a train. The housing of the adapter includes first and second connector bodies and an intermediate portion situated between the two connector bodies. The adapter housing encloses a flow chamber that runs from the first connector body through the intermediate portion to the second connector body. The intermediate portion defines a vertically disposed access port in communication with the flow chamber of the adapter housing. The connector bodies are formed on opposite, vertically oriented sides of the adapter housing. Each connector body features a mating surface from which a flow port in communication with the flow chamber emerges. Each connector body also includes a mechanism that allows the connector body to mechanically couple to one of the glad hands. When so coupled, the mating surface of the connector body is aligned with the mating surface of its corresponding glad hand with a sealing member of the glad hand held in compression therebetween. By coupling the glad hands to connector bodies of the adapter, a leak proof passage is provided from one glad hand through the flow chamber and the flow ports of the adapter housing to the other glad hand. It is directly to the access port or indirectly via a fitting that an external device can connect for the purpose of affecting the pressure contained by the brake pipe of the train.

20 Claims, 4 Drawing Sheets

APPARATUS FOR CONNECTING A DEVICE INTO A BRAKE PIPE HOSE CONNECTION BETWEEN RAILWAY CARS AND/OR LOCOMOTIVES

FIELD OF THE INVENTION

The invention generally relates to glad hand couplers of the type that are used to interconnect the brake pipe hoses of each of the railcars and/or locomotives in a train. More particularly, the invention relates to an adapter designed to interconnect the two glad hands of a glad hand coupler and to provide an access port to which a variety of external devices can connect for the purpose of affecting the pressure contained within the brake pipe of a train.

BACKGROUND OF THE INVENTION

The following background information is provided to assist the reader to understand the environment in which the invention will typically be used. The terms used herein are not intended to be limited to any particular narrow interpretation unless specifically stated otherwise in this document.

A typical freight train includes one or more locomotives and a plurality of railcars. A pneumatic trainline known as the "brake pipe" is the means by which brake commands are pneumatically conveyed from the lead locomotive to each of the railcars in the train. The brake pipe is essentially one long continuous tube that runs from the lead locomotive to the last railcar. The brake pipe is actually composed of a series of interconnected pipe lengths, with one pipe length secured to the underside of each railcar. As shown in FIG. 1, the pipe length 1 on each railcar is connected at each end to one end of an angle cock 2. (Closing an angle cock 2 prevents air from flowing along the brake pipe, generally designated 5, to any of the railcars located downstream of the closed angle cock.) Each angle cock 2 is connected at its other end to one end of a hose 3, with the other end of the hose being connected to a glad hand 4. When the glad hands of adjacent railcars are coupled together, they form a glad hand coupler—the pneumatic connection that links the pipe lengths of the adjacent railcars. The brake pipe 5 of the train is formed by coupling the glad hand 4 of each railcar to the glad hand of the railcar or locomotive located immediately adjacent to it. It is to the brake pipe 5 that the brake equipment on each railcar connects via a branch pipe 6.

By moving a brake handle located in the lead locomotive, a train operator can control how much, if any, pressure is contained within the brake pipe 5 and thus whether, and to what extent, the train brakes will be applied. The positions into which the brake handle can be moved include release, minimum service, full service, suppression, continuous service and emergency. Between the minimum and full service positions lies the service zone wherein each incremental movement of the brake handle toward the full service position causes the brake pipe pressure to reduce incrementally.

As shown in FIG. 1, the brake equipment on a typical freight railcar includes two storage reservoirs 7/8, one or more brake cylinders 9 and at least one brake control valve 10 such as an ADB, ABDX or ABDW type valve made by the Westinghouse Air Brake Company (WABCO). The brake control valve has a service portion 11 and an emergency portion 12 typically mounted on opposite sides of a pipe bracket 13. The pipe bracket features a number of internal passages and several ports. Each port connects to one of the interconnecting pipes from the railcar such as those leading to the brake pipe, the brake cylinder and the two reservoirs. It is through the ports and internal passages of the pipe bracket 13 that the service and emergency portions 11 and 12 of the brake control valve 10 communicate fluidly with the pneumatic piping on the railcar.

For trains equipped with conventional pneumatic brake systems, for example, it is well known that the pressure level within the brake pipe 5 determines whether the brake control valve 10 will charge the reservoirs or deliver pressurized air previously stored in one or both of these reservoirs to the brake cylinders 9. By changing the pressure within the brake pipe, the brake pipe 5 can be used to convey release, service and emergency brake commands to the brake equipment on each railcar in the train. In response to a release brake command (i.e., when brake pipe pressure is increased to 90 psi on a freight train, for example), the service portion 11 of the brake control valve not only charges the two reservoirs with the pressurized air it receives from the brake pipe 5 but also vents the brake cylinders to atmosphere thereby causing the brakes on the train to release. In response to a service brake command (i.e., when brake pipe pressure is reduced at a service rate), the service portion 11 supplies air from only one of the two reservoirs 7 to the brake cylinders 9 so as to apply the train brakes. How much the brake pipe pressure is reduced, and thus the magnitude of the service brake application, depends on how far the brake handle is moved towards the full service position. In response to an emergency brake command (i.e., when the brake pipe pressure is reduced to zero at an emergency rate), the emergency portion 12 of the brake control valve supplies air from both reservoirs 7 and 8 to the brake cylinders 9 so as to apply the train brakes fully. The emergency portion 12 also accelerates the pressurizing of the brake cylinders 9 by venting the brake pipe 5 locally at the railcar.

When pressurized, the brake cylinders 9 convert the pressurized air that they receive from the brake control valve 10 to mechanical force. From the brake cylinders this force is transmitted by mechanical linkage (not shown) to the brake shoes (not shown). The magnitude of the braking force applied to the wheels is directly proportional to the pressure built up in the brake cylinders 9. Forced against the truck wheels and/or disc brakes, the brake shoes are used to slow or stop the rotation of the wheels. For trains equipped with conventional pneumatic brake systems, it is thus the pressure level within the brake pipe 5 that determines whether and to what extent the brakes of the train will be applied.

From the foregoing, it is quite apparent that the operation of the brake equipment on each railcar depends upon the integrity of the brake pipe 5. Especially for long freight trains, the brake pipe 5 must be highly resistant to leaks. The design of the glad hand 4 makes this possible.

The glad hand coupler is gender neutral, i.e., its design does not employ a male-to-female connection arrangement. Consequently, any one glad hand can connect to any other glad hand to form a glad hand coupler. As shown in FIGS. 2 and 3, each glad hand 4 is comprised of a connector body 20 that has a restraining arm 30 and two arcuate projections 31 and 32. Typically cast as a single piece component, the connector body 20 is essentially a pipe whose passage 21 runs from a nipple 22 at one end to a flow port 23 at the other end. The nipple end 22 is designed to connect to the brake pipe hose 3 on the railcar as shown in FIG. 1.

The connector body 20 features a mating surface 24 from which the flow port 23 emerges, with the longitudinal axis of the flow port 23 being essentially perpendicular to the longitudinal axis of the passage 21. Adjacent to the mating surface 24 and within the cylindrical boundary wall 23A that defines the flow port 23 lies an annular recess 25. Into this annular recess 25 snaps a ring-shaped compressible sealing member 26, an outermost part 27 of which extending beyond the mating surface 24 and into the connector slot 28 between the two arcuate projections 31 and 32 of the glad hand 4. The sealing member 26 is typically composed of rubber or other suitable compressible sealing material.

Coupling two glad hands 4 together involves moving the two connector bodies 20 towards one another to an inverted "V" position such that their respective arcuate projections 32 and restraining arms 30 are nearly perpendicular to one another. Once their respective flow ports 23 are juxtaposed and the arcuate projection 32 of one is aligned to engage the arcuate projection 31 of the other, the two glad hands are ready to be rotated together about an axis shared by the centers of the two flow ports 23. Each arcuate projection 31 and 32 has a tapered lead-in groove 33. By rotating the connector bodies 20 from the inverted "V" position towards an upright "V" position, the arcuate projection 32 of one glad hand engages within the groove 33 of the arcuate projection 31 of the other glad hand and vice versa. Consequently, as the opposing projections are engaged, the compressible sealing members 26 of the two connector bodies 20 are forced together. Compressed in this manner, the sealing members 26 not only serve to hold the arcuate projections into their corresponding grooves but also provide the necessary air tight seal. This allows the flow port 23 of the one glad hand to communicate with the flow port 23 of the other glad hand with little or no leakage of air from the brake pipe.

The restraining arm 30 atop each glad hand 4 limits the extent to which the glad hands can be rotated together as the tip 35 of each arm confronts the upper tab 29 of its corresponding arcuate projection 31. Thus, only by rotating the connector bodies 20 in the opposite direction can the two glad hands 4 be disconnected from each other.

Due to the length and disposition of the brake pipe hoses 3 on the vehicles of the train, the glad hands 4 when coupled together lie at an angle relative to the centerline of the adjacent vehicles. Consequently, the glad hand coupler and its two interconnected brake hoses dangle a safe distance above the railway track and thereby avoid contact with the rails, railroad ties, road crossings and other potential obstructions.

The restraining arm 30 of a glad hand also defines a carrier hole 36 to which a bungee cord can be attached. When adjacent vehicles are mechanically uncoupled and pulled away from each other, the two glad hands 4 are designed to automatically rotate in the opposite direction and eventually uncouple as their respective brake hoses 3 become taut. With its other end attached to the mechanical coupler, each bungee cord prevents its glad hand 4 from falling to the railway track when the adjacent vehicles are mechanically uncoupled.

Presently, there is no need to intercept or otherwise disturb the glad hand couplers between the vehicles of a train. At some future date, however, it is anticipated that a device will eventually be developed that, if given access to the brake pipe between the rail vehicles, will allow the brake pipe to be vented at that location during a brake application. By installing one or more of these devices at various points throughout a freight train, the brake pipe could be vented much more rapidly than is otherwise possible with currently known means. Such a device would thus enable the brakes of a train to be applied much faster than is currently possible on many types of trains currently in service. This is especially true of trains equipped with conventional pneumatic brake control systems as the reduction in pressure typically starts at the lead locomotive and takes quite some time to progress along the brake pipe to the last railcar in the train.

Various designs have been proposed for an adapter whose purpose would be to connect between the glad hands and to provide such a device access to the brake pipe between the vehicles of the train. Of the adapters that have been proposed, all have consisted of combinations of existing hardware (e.g., three glad hand fittings connected in a "T" arrangement). The adapters resulting from these proposed designs, however, have proven to be inadequate or inappropriate to the task. The size or arrangement of the parts in these designs have caused excessive twisting or displacement of the brake pipe hoses. For example, these proposed adapters have caused the hoses to kink excessively and the glad hands to which they are connected to dangle precariously close to the railway track where they are more likely to strike rails, railroad ties, road crossings and other potential obstructions. The invention described and claimed below is intended to address these shortcomings.

OBJECTIVES OF THE INVENTION

It is, therefore, an objective of the invention to provide an adapter that can interconnect the two glad hands of a glad hand coupler and provide an access port to which an external device can connect for the purpose of affecting the pressure contained by the brake pipe of a train.

Another objective is to provide an adapter that will maintain the glad hands to which it is connected and their respective brake pipe hoses a safe distance above the railway track and prevent those brake pipe hoses from kinking or otherwise becoming misaligned.

Yet another objective is to provide such an adapter—whether it be a single piece casting, a machined part or assembled from separate parts—that is light in weight.

Still another objective is to provide an adapter that, when coupled to and in between the glad hands of adjacent rail vehicles, does not adversely affect the flow of air within the brake pipe of the train.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the following drawings and claims.

SUMMARY OF THE INVENTION

In a first presently preferred embodiment, the invention provides an adapter for interconnecting the two glad hands of a glad hand coupler, the type of pneumatic coupler used to interconnect the brake pipe hoses of adjacently disposed vehicles in a train. The body of the adapter has first and second connector bodies and an intermediate portion situated between the two connector bodies. The adapter body defines a flow chamber from the first connector body through the intermediate portion to the second connector body. The intermediate portion further defines an access port, preferably disposed vertically, in communication with the flow chamber. The two connector bodies are oriented on opposite sides of and the adapter body. Each connector body features a mating surface and inner and outer arcuate grooved projections. The mating surface of each connector body defines a flow port that directly communicates with the flow chamber of the adapter body. The inner and outer arcuate grooved projections of each connector body are matched to engage with the outer and inner arcuate grooved projections, respectively, found on each of the glad hands. Coupling each glad hand to its corresponding connector body causes a sealing member of the glad hand to undergo compression and forcibly push and hold the arcuate grooved projections of the glad hand within the arcuate grooved projections of the connector body and vice versa. This provides a continuous air tight passage from one glad hand through the flow chamber and flow ports of the adapter body to the other glad hand. A variety of external devices can be connected to the access port of the adapter for the purpose of affecting the pressure contained within the brake pipe of a train.

In a second presently preferred embodiment, the invention likewise provides an adapter for interconnecting the two glad hands of a glad hand coupler. This adapter also features the first and second connector bodies but omits the intermediate portion. The connector bodies are thus disposed with their back sides affixed to each other. Adjoined back-to-back, the connector bodies together define the flow chamber from the first connector body to the second connector body. The connector bodies also define the access port in communication with the flow chamber. As with the first embodiment, the connector bodies each have on a front side thereof the mating surface from which the flow port in communication with the flow chamber emerges. The adapter also includes a mechanism, on each connector body, for mechanically coupling a connector body and a glad hand. The coupling mechanism assures that the mating surface of the connector body will align with a corresponding mating surface on the glad hand, with the sealing member of the glad hand compressed therebetween. By coupling the glad hands to the adapter, a leak proof passage is established from one glad hand through the flow chamber and flow ports of the adapter to the other glad hand.

DETAILED DESCRIPTION OF THE INVENTION

Figure 1:
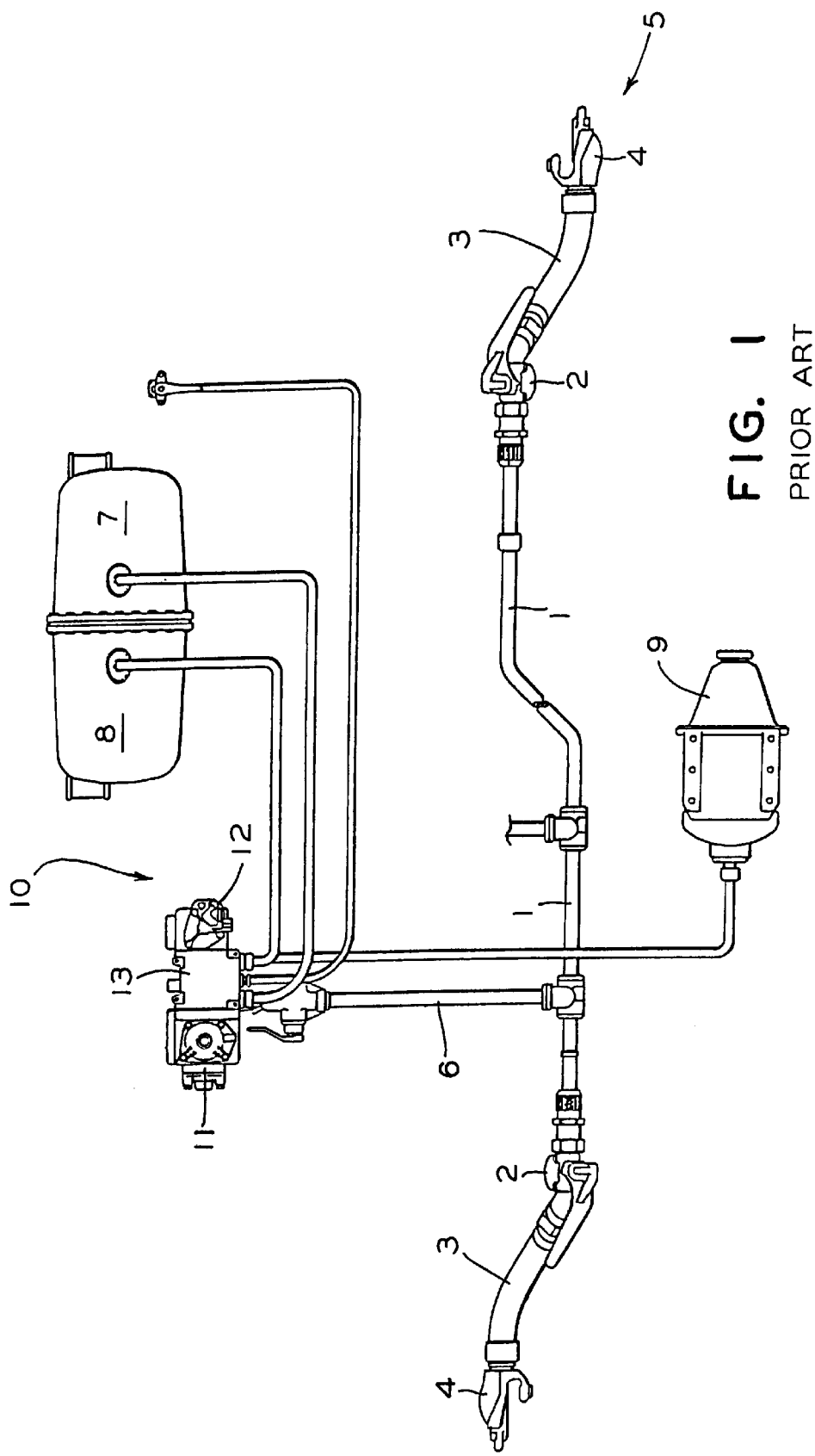
FIG. 1 illustrates the brake pipe of a freight railcar and the railcar brake equipment to which it connects.

Before describing the invention in detail, the reader is advised that, for the sake of clarity and understanding, identical components having identical functions have been marked where possible with the same reference numerals in each of the Figures provided in this document.

Figure 4:
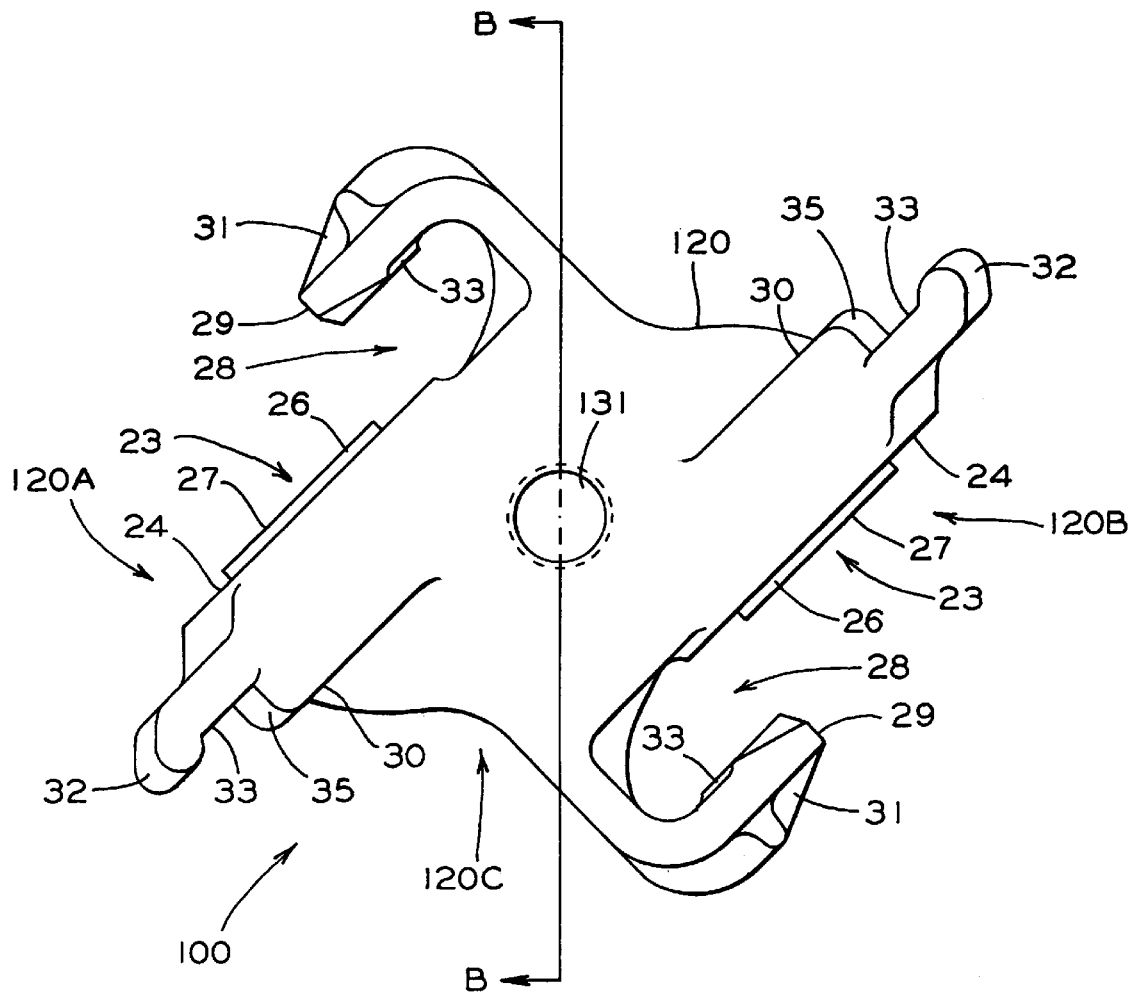
FIG. 4 is a top view of an adapter according to a first embodiment of the invention.
Figure 5:
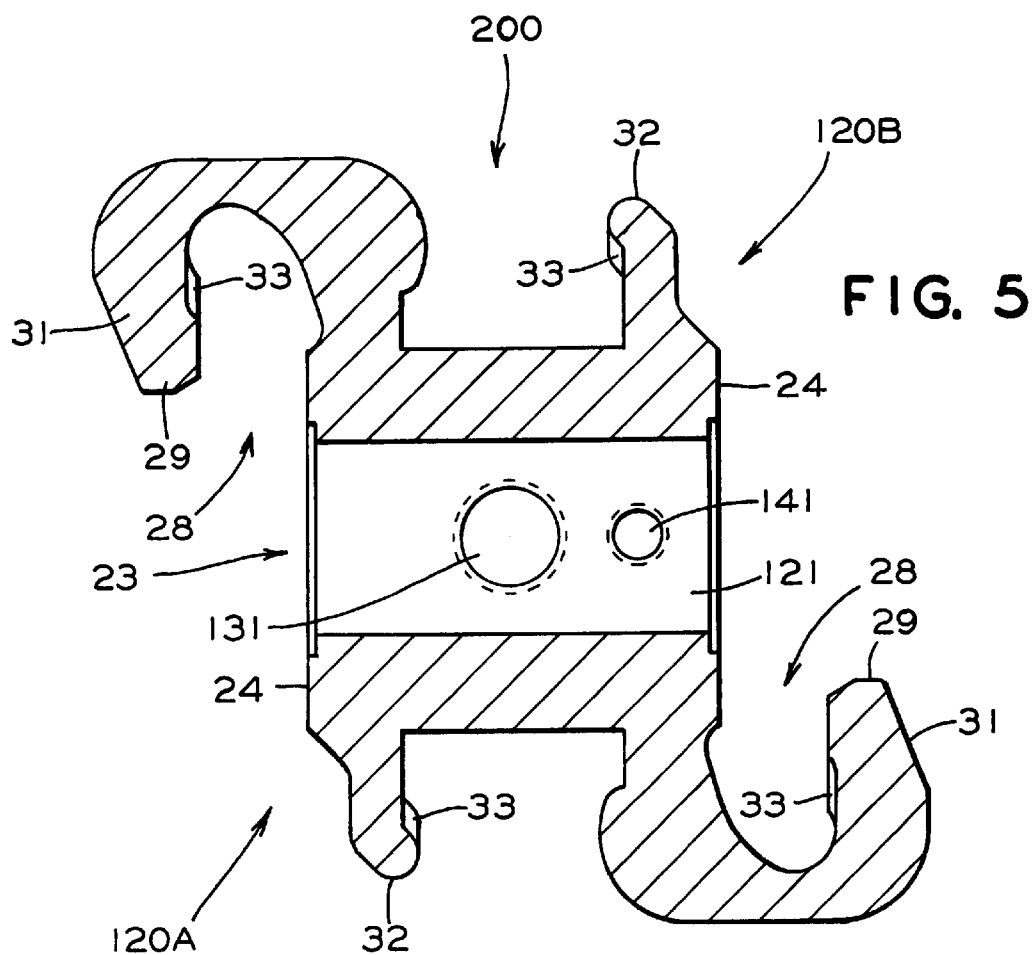
FIG. 5 is a top view of an adapter according to a second embodiment of the invention.
Figure 6:
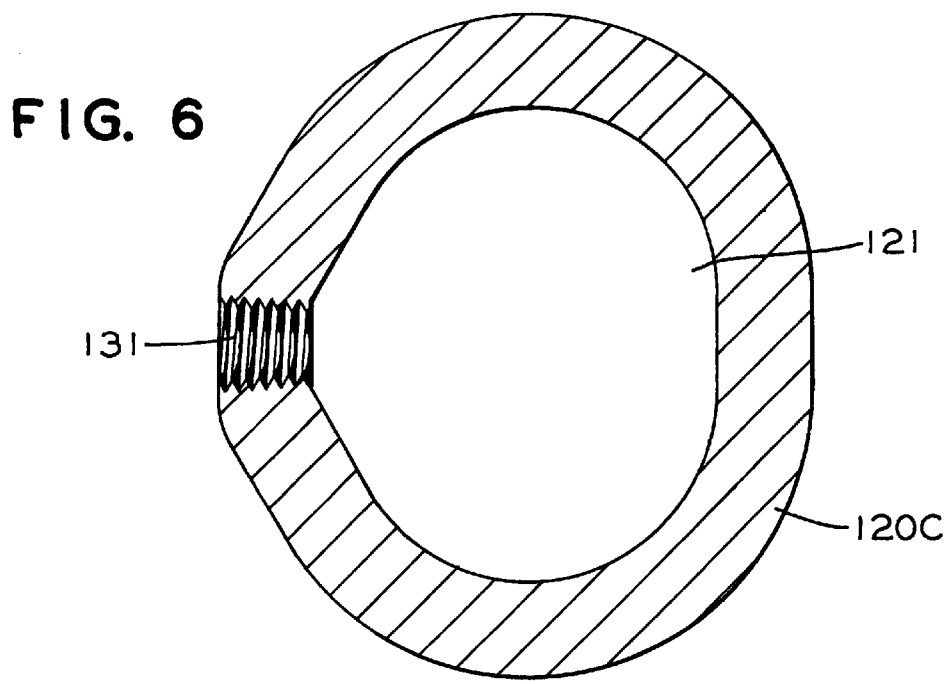
FIG. 6 is a cross-sectional view of the adapter from the perspective of line B—B drawn in FIGS. 4 and/or 5.

FIGS. 4–6 illustrate the essential details of an adapter that is designed to provide access to the brake pipe of a train. Specifically, the adapter is designed to interconnect the two glad hands of a glad hand coupler, the pneumatic connection between each of the railcars and/or locomotives that is used to form the brake pipe of the train.

Referring to a first presently preferred embodiment of the invention shown in FIG. 4, the adapter 100 takes the form of a light weight, preferably single piece, housing or body 120. The adapter body 120 features a first connector body 120A, a second connector body 120B and an intermediate portion 120C situated between the two connector bodies. The adapter body 120 defines a flow chamber 121 from the first connector body 120A through the intermediate portion 120C to the second connector body 120B. A limited cross-sectional view of the flow chamber 121 is also shown in FIG. 6. As shown in FIGS. 4 and 6, the intermediate portion 120C further defines an access port 131 that directly communicates with the flow chamber 121 of the adapter body 120. Preferably, the access port 131 is disposed so that its axis lies vertically when the adapter 100 is installed as described below.

Figure 2:
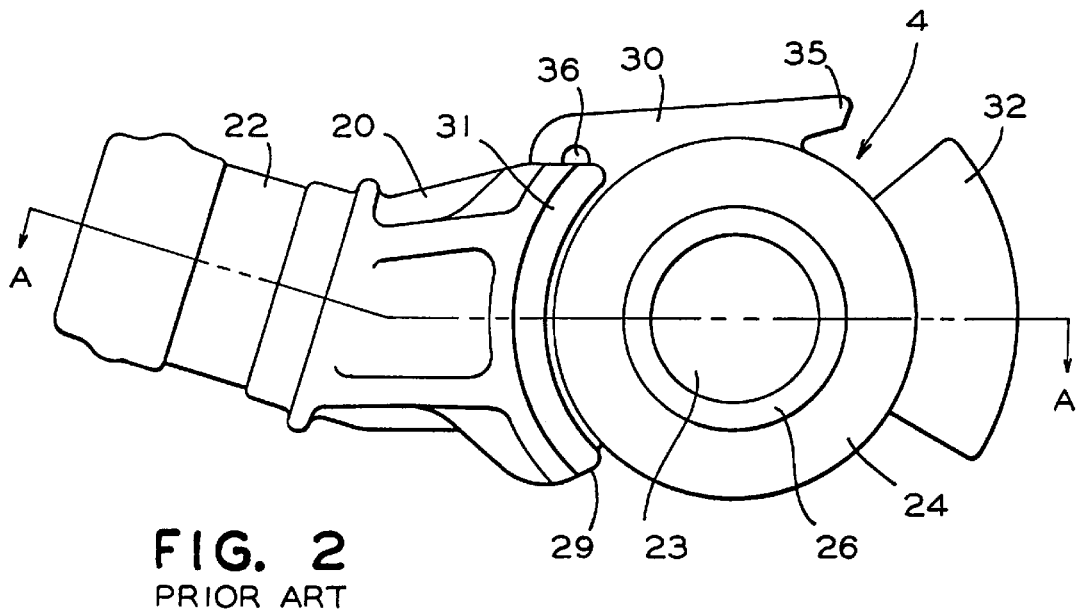
FIG. 2 is a side view of the glad hand illustrated in FIG. 1.
Figure 3:
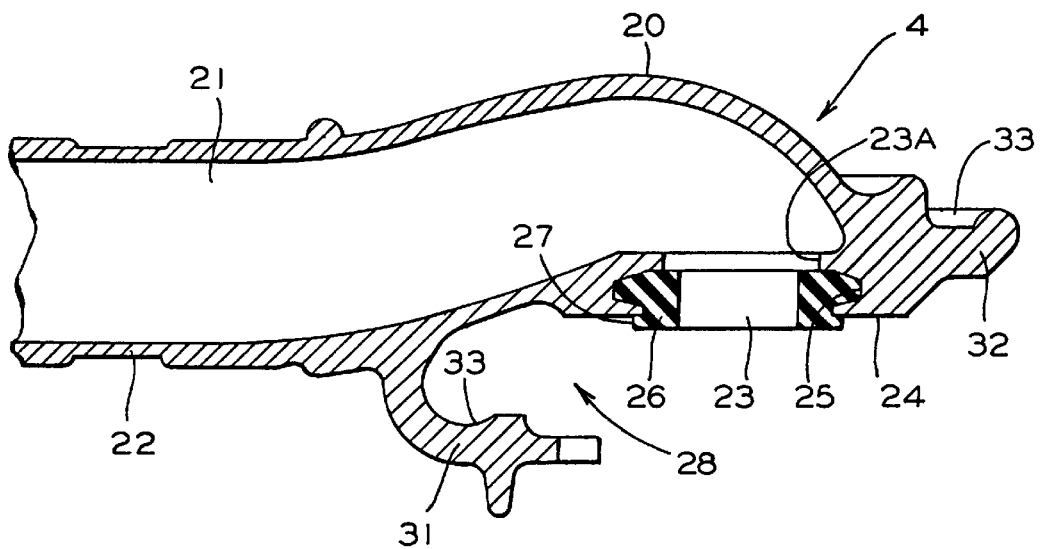
FIG. 3 is a cross-sectional view of the glad hand from the perspective of sectional line A—A drawn in FIG. 2.

The two connector bodies 120A and 120B are oriented vertically on opposite sides of and the adapter body 120, as shown in FIG. 4. With reference also to FIGS. 2 and 3, like the connector body of a glad hand, each connector body of the adapter 100 features a mating surface 24 and inner and outer arcuate grooved projections 31 and 32. Each arcuate projection 31 and 32 also has a tapered lead—in groove 33. Also like the connector body of a glad hand, the mating surface 24 of each connector body 120A/120B defines a flow port 23. The flow port of each connector body 120A/120B, however, directly communicates with the flow chamber 121 of the adapter body. Unlike the glad hand shown in FIG. 3, however, the boundary wall 23A of each flow port 23 does not define an annular recess.

The inner and outer arcuate grooved projections 31 and 32 of each connector body are matched to engage with the outer and inner arcuate grooved projections 32 and 31, respectively, of a glad hand. Coupling a glad hand to a connector body of the adapter 100 causes the sealing member 26 of the glad hand to undergo compression and forcibly push and hold the outer and inner arcuate grooved projections 32/31 of the glad hand within the inner and outer arcuate grooved projections 31/32 of the connector body and vice versa. Specifically, by rotating the connector body of a glad hand with the connector body 120A/120B of the adapter from the inverted "V" position towards an upright "V" position, the outer arcuate projection 32 of the glad hand engages within the groove 33 of the inner arcuate projection 31 of the connector body of the adapter and vice versa. Consequently, as the opposing projections of the glad hand and the connector body 120A/120B are engaged, the compressible sealing member 26 of the glad hand is compressed against the mating surface 24 of the connector body 120A/102B. Compressed in this manner, the sealing member 26 of the glad hand not only serves to hold the respective arcuate projections into their corresponding grooves but also provides the necessary air tight seal between the connector body 120A/120B and the glad hand.

It should be apparent that, for each connector body 120A/120B, the inner and outer arcuate grooved projections 31/32 essentially serve as a means for mechanically coupling together the connector body 120A/120B to its corresponding glad hand. The purpose of this mechanical coupling means is to assure that the mating surface 24 of the connector body 120A/120B is aligned with the corresponding mating surface of the glad hand, with the sealing member 26 of the glad hand compressed therebetween. Various other arrangements of these parts or even different parts that together perform the same function as this mechanical coupling means are intended to be encompassed by one or more of the claims set forth below.

In the preferred embodiments of the invention, each connector body of the adapter 100 need not have a restraining arm such as the restraining arm 30 found on each of the glad hands. From the point of view of adapter 100, the upper tab 29 on each inner arcuate projection of the connector body 120A/120B is sufficient to limit the extend to which a glad hand and a connector body 120A/120B can be rotated together. This is because the tip 35 of the restraining arm 30 of the glad hand, as shown in FIG. 2, is relied upon to confront the upper tab 29 on the inner arcuate projection of the connector body 120A/120B, as shown in FIG. 4. Consequently, only by rotating the glad hand and the connector body 120A/120B in the opposite direction (from the coupled "V" like position towards the horizontal position) can this pneumatic coupling be uncoupled.

With its connector bodies 120A and 120B coupled to the glad hands of the two adjacently situated vehicles, the adapter 100 provides a continuous air tight passage from one glad hand through the flow chamber 121 and flow ports 23 of adapter body 120 to the other glad hand. For this reason, the internal contours of the flow chamber 121 and the flow ports 23 of adapter 100 are designed so as to avoid any adverse affect on the flow of air within the brake pipe of the train.

By installing the adapter to and in between the glad hands of a glad hand coupler, the adapter 100 via its access port 131 permits access to the brake pipe of the train. Located in the intermediate portion 120C of adapter body 120, the access port 131 is preferably a threaded hole in which any one of a variety of fittings can be secured. In a limited cross-sectional view of the intermediate portion 120C, FIG. 6 illustrates this threaded hole 131 from the perspective of sectional line B—B of FIG. 4. It is directly to this access port 131 or indirectly via such a fitting that an external device can connect for the purpose of affecting the pressure contained by the brake pipe of the train.

The upper tab 29 of each connector body 120A/120B, viewed with respect to the restraining arm 30 of its corresponding glad hand, may essentially be considered as a means for limiting the extent to which the connector body 120A/120B and glad hand can be rotated together during coupling of the glad hand and the connector body. It should be understood that this limiting means could also be implemented using various other components and/or arrangements that together perform the same function as this limiting means. For this reason, the claims set forth below are also intended to encompass these various components and/or arrangements.

Referring now to an optional feature for the first embodiment of the invention, the adapter 100 includes two ring-shaped compressible sealing members 26 in addition to the adapter body 120. Essentially the same as the adapter body 120 previously described, this adapter body is different only to the extent necessary to accommodate the two sealing members 26. Specifically, like the glad hand shown in FIG. 3, the boundary wall 23A of each flow port 23 now defines an annular recess 25.

For this optional feature, each ring-shaped sealing member 26 is designed to securely snap into the annular recess 25 of one of the connector bodies 120A/120B. When so secured, an outermost part 27 of the sealing member 26 extends beyond the mating surface 24 and into the connector slot 28 between the two arcuate projections 31 and 32 of the connector body. The sealing member 26 thus seals around and projects outwardly of the flow port 23 of its mating surface 24. Like the sealing member of a glad hand, the sealing member 26 of the invention may be composed of rubber or any one of the many other sealing materials known in the pneumatic arts.

It should be apparent that the added sealing members 26 are needed for this optional feature only because each flat mating surface 24 is designed so that it does not project so far into its corresponding connector slot area 28 (as compared to the first embodiment without this feature). The resulting extra space in the slot area 28 thus leaves sufficient room for the outermost part 27 of the added sealing member 26.

Coupling a glad hand to a connector body 120A/120B thus causes the sealing member 26 of the connector body and the sealing member of the glad hand to compress together. Under such compression, and with the opposing projections of the glad hand and its corresponding connector body 120A/120B engaged, these two compressed sealing members forcibly push and hold the outer and inner arcuate grooved projections 32/31 of the glad hand within the inner and outer arcuate grooved projections 31/32 of the connector body and vice versa. The actual coupling of the connector bodies 120A/120B to the two glad hands of the adjacent railcars is, of course, carried out in the same manner as that described above for the first embodiment. With this optional feature, the sealing members 26 of the connector body and glad hand not only combine to hold the respective arcuate projections into their corresponding grooves but also provide a different type of air tight seal between the connector body 120A/120B and the glad hand.

Oriented vertically on opposite sides of the adapter body 120 as shown in FIG. 4, the connector bodies 120A and 120B are disposed in close in proximity to each other, separated only by the relatively narrow width of the intermediate portion 120C. Moreover, the connector bodies 120A and 120B are offset from each other, with the axis of flow port 23 of connector body 120A being set a predetermined distance from the axis of flow port 23 of connector body 120B. Consequently, assuming brake pipe hoses of standard length, the adapter and glad hands when completely coupled together lie at only a slightly greater angle relative to the centerline of the adjacent vehicles than does the glad hand coupler by itself. Symmetrically configured in this manner, the adapter thus prevents misalignment and kinking of the brake pipe hoses and avoids excessive dangling of the adapter, glad hands and hoses between the railcars and/or locomotives of a train. The combined connection—adapter, glad hands and brake pipe hoses—is thus held a safe distance above the railway track and thereby avoids contact with the rails, railroad ties, road crossings and other potential obstructions.

Referring to a second presently preferred embodiment of the invention shown in FIG. 5, the adapter 200 features first and second connector bodies 120A and 120B. Similar in most respects to adapter 100 of the first embodiment, this adapter 200 is different as the intermediate portion 120C has been essentially omitted. The connector bodies 120A/120B are thus disposed with their back sides affixed to each other. Adjoined back-to-back, the connector bodies together define the flow chamber 121 from the first connector body 120A to the second connector body 120B. The connector bodies further define the access port 131 in communication with the flow chamber 121. A second port 141 may also be provided to which a release valve could be installed. This could be used to release the pressure from within the brake pipe prior to uncoupling the brake hoses. As with the first embodiment, the connector bodies each have on a front side thereof the mating surface 24 from which the flow port 23 in communication with the flow chamber 121 emerges.

As is clear from FIG. 5, the mating surfaces 24 of connector bodies 120A/120B are situated even closer in proximity to each other, as the intermediate portion 120C has been omitted. The connector bodies 120A and 120B of this second embodiment are also no longer offset from each other, as is the case with adapter 100 of the first embodiment. Specifically, the flow ports 23 of the two connector bodies now share the same center axis. Consequently, the adapter 200 and glad hands when completely coupled together lie at an even slighter angle relative to the centerline of the adjacent vehicles than does the adapter 100 (with glad hands coupled thereto) of the first embodiment. Configured in this manner, the adapter 200 also prevents misalignment and kinking of the brake pipe hoses and avoids excessive dangling of the adapter, glad hands and hoses between the railcars and/or locomotives of a train.

For either embodiment or both, the adapter may optionally include a restraining arm on each connector body 120A/120B, like the restraining arm 30 on a glad hand. Like the upper tab 29 on each connector body 120A/120B vis-a-vis the restraining arm of a glad hand, the restraining arm 30 atop each connector body 120A/120B would also serve to limit the extent to which a glad hand and a connector body could be rotated together. This is because the tip 35 of the restraining arm 30 of the connector body confronts the upper tab 29 on the inner arcuate projection 31 of the glad hand. As noted above, only by rotating the glad hand and the connector body in the opposite direction (from the coupled "V" like position towards the horizontal position) can this pneumatic coupling be uncoupled.

Taken individually or together, the restraining arm 30 and upper tab 29 of each connector body 120A/120B may be considered as the aforementioned means for limiting the extent to which the connector body 120A/120B and glad hand can be rotated together. As noted above, these two components are intended to work with the upper tab 29 and restraining arm 30, respectively, of a corresponding glad hand. As previously noted, this limiting means could also be implemented using various other components and/or arrangements that together perform the same function as this limiting means. The claims set forth below are therefore intended to encompass these other components and/or arrangements.

The design of the adapter allows the adapter and both of the glad hands to rotate with respect to each other in the opposite direction (i.e., from the coupled "V" like position towards the horizontal position) when the adjacent vehicles are mechanically uncoupled and pulled away from each other. Once the brake pipe hoses become taut as the vehicles separate, one or both glad hands will automatically uncouple from the adapter. For this reason, the adapter may also define a carrier hole 36, similar to the one shown in FIG. 2, to which a bungee or similar cord can be attached. Used to connect the adapter to the mechanical coupler on one of the separating rail vehicles, the cord will prevent the adapter from falling to the railway track when the adjacent vehicles are mechanically uncoupled.

The preferred embodiments for carrying out the invention have been set forth in detail according to the Patent Act. Those persons of ordinary skill in the art to which this invention pertains may nevertheless recognize various other ways of practicing the invention without departing from the spirit and scope of the following claims. Those of such skill will also recognize that the foregoing description is merely illustrative and not intended to limit any of the following claims to any particular narrow interpretation.

Accordingly, to promote the progress of science and the useful arts, we secure for ourselves by Letters Patent exclusive rights to all subject matter embraced by the following claims for the time prescribed by the Patent Act.

We claim:

1. An adapter for interconnecting two glad hands of a glad hand coupler, said adapter comprising:
   (a) an adapter body having (i) first and second connector bodies and (ii) an intermediate portion situated between said connector bodies, said adapter body defining a flow chamber from said first connector body through said intermediate portion to said second connector body with said intermediate portion further defining an access port in communication with said flow chamber, said connector bodies being oriented on opposite sides of and facing outward from said adapter body with each of said connector bodies featuring a mating surface from which a flow port in communication with said flow chamber emerges; and
   (b) a means, on each of said connector bodies, for mechanically coupling said connector body to such glad hand corresponding thereto so that said mating surface of said connector body is aligned with a corresponding mating surface of such glad hand and a sealing member of such glad hand is compressible therebetween; so that upon coupling of each of such glad hands to said adapter a leak proof passage is provided from one such glad hand through said flow chamber and said flow ports of said adapter body to the other such glad hand.

2. The adapter, as claimed in claim 1, wherein said means for mechanically coupling includes inner and outer arcuate grooved projections matched to engage with outer and inner arcuate grooved projections, respectively, on such glad hand such that upon coupling of each such glad hand to a corresponding one of said connector bodies, such sealing member by virtue of being compressed forcibly pushes and thereby holds such arcuate grooved projections of such glad hand within said arcuate grooved projections of said connector body and vice versa thereby providing said leak proof passage from one such glad hand through said flow chamber and said flow ports of said adapter body to the other such glad hand.

3. The adapter, as claimed in claim 2, wherein each of said connector bodies includes a means for limiting an extent to which such glad hand and said adapter can be rotated together during coupling of such glad hand and said connector body.

4. The adapter, as claimed in claim 3, wherein said connector bodies are close in proximity to and offset a predetermined distance from each other on said opposite sides of said adapter body.

5. The adapter, as claimed in claim 3, wherein said means for limiting includes an upper tab on said inner arcuate grooved projection of said connector body that is confronted by a tip of a restraining arm of such glad hand when such glad hand and said connector body have been fully coupled together.

6. The adapter, as claimed in claim 5, wherein said means for limiting also includes a restraining arm having a tip at one end that confronts an upper tab of such inner arcuate grooved projection of such glad hand when such glad hand and said connector body have been fully coupled together.

7. The adapter, as claimed in claim 5, wherein said access port is a vertically oriented threaded hole.

8. The adapter, as claimed in claim 1, wherein each of said connector bodies includes a means for limiting an extent to which such glad hand and said adapter can be rotated together during coupling of such glad hand and said connector body.

9. The adapter, as claimed in claim 1, wherein said connector bodies are close in proximity to and offset a predetermined distance from each other on said opposite sides of said adapter body.

10. An adapter for interconnecting two glad hands of a glad hand coupler, said adapter comprising:
   (a) an adapter body having (i) first and second connector bodies and (ii) an intermediate portion situated between said connector bodies, said adapter body defining a flow chamber from said first connector body through said intermediate portion to said second connector body with said intermediate portion further defining an access port in communication with said flow chamber, said connector bodies being oriented on opposite sides of said adapter body and each of said connector bodies featuring (A) a mating surface from which a flow port in communication with said flow chamber emerges, with said flow port having a boundary wall within which an annular recess is defined and (B) inner and outer arcuate grooved projections matched to engage with outer and inner arcuate grooved projections, respectively, on each of such glad hands; and
   (b) a ring-shaped sealing member securable within said annular recess of each of said connector bodies to seal around and project outwardly of said flow port of said mating surface; such that coupling each such glad hand to said connector body corresponding thereto causes said sealing member of said connector body and a sealing member of such glad hand to undergo compression and forcibly push and hold such arcuate grooved projections of such glad hand within said arcuate grooved projections of said connector body and vice versa; thereby providing a continuous air tight passage from one such glad hand through said flow chamber and said flow ports of said adapter body to the other such glad hand.

11. The adapter, as claimed in claim 10, wherein each of said connector bodies includes a means for limiting an extent to which such glad hand and said adapter can be rotated together during coupling of such glad hand and said connector body.

12. The adapter, as claimed in claim 11, wherein said connector bodies are close in proximity to and offset a predetermined distance from each other on said opposite sides of said adapter body.

13. The adapter, as claimed in claim 11, wherein said means for limiting includes an upper tab on said inner arcuate grooved projection of said connector body that is confronted by a tip of a restraining arm of such glad hand when such glad hand and said connector body have been fully coupled together.

14. The adapter, as claimed in claim 13, wherein said means for limiting also includes a restraining arm having a tip at one end that confronts an upper tab of such inner arcuate grooved projection of such glad hand when such glad hand and said connector body have been fully coupled together.

15. The adapter, as claimed in claim 13, wherein said access port is a vertically oriented threaded hole.

16. The adapter, as claimed in claim 14, wherein said access port is a vertically oriented threaded hole.

17. The adapter, as claimed in claim 10, wherein said connector bodies are close in proximity to and offset a predetermined distance from each other on said opposite sides of said adapter body.

18. An adapter for interconnecting two glad hands of a glad hand coupler, said adapter comprising:
   (a) first and second connector bodies each featuring back and front sides, said connector bodies being disposed with said back sides thereof affixed to each other with said connector bodies defining (i) a flow chamber from said first connector body to said second connector body and (ii) an access port in communication with said flow chamber, said connector bodies each having on said front side thereof a mating surface facing outward from said adapter body from which a flow port in communication with said flow chamber emerges; and
   (b) a means, on each of said connector bodies, for mechanically coupling said connector body and such glad hand corresponding thereto so that said mating surface of said connector body is aligned with a corresponding mating surface of such glad hand and a sealing member of such glad hand is compressible therebetween; so that upon coupling of each of such glad hands to said adapter a leak proof passage is provided from one such glad hand through said flow chamber and said flow ports of said adapter to the other such glad hand.

19. The adapter, as claimed in claim 18, wherein said means for mechanically coupling includes inner and outer arcuate grooved projections matched to engage with outer and inner arcuate grooved projections, respectively, on such glad hand such that upon coupling of each such glad hand to a corresponding one of said connector bodies, such sealing member by virtue of being compressed forcibly pushes and thereby holds such arcuate grooved projections of such glad hand within said arcuate grooved projections of said connector body and vice versa thereby providing said leak proof passage from one such glad hand through said flow chamber and said flow ports of said adapter to the other such glad hand.

20. The adapter, as claimed in claim 19, wherein each of said connector bodies includes a means for limiting an extent to which such glad hand and said adapter can be rotated together during coupling of such glad hand and said connector body.

* * * * *